US011072371B2

(12) United States Patent
Cho et al.

(10) Patent No.: US 11,072,371 B2
(45) Date of Patent: Jul. 27, 2021

(54) APPARATUS AND METHODS FOR ADDITIVELY MANUFACTURED STRUCTURES WITH AUGMENTED ENERGY ABSORPTION PROPERTIES

(71) Applicant: DIVERGENT TECHNOLOGIES, INC., Los Angeles, CA (US)

(72) Inventors: Yong-Bae Cho, Torrance, CA (US); Antonio Bernerd Martinez, El Segundo, CA (US); Jon Paul Gunner, Palos Verdes Estates, CA (US); Alexander Pai-chung Teng, Lomita, CA (US); Broc William TenHouten, Rancho Palos Verdes, CA (US); Narender Shankar Lakshman, Hermosa Beach, CA (US); Richard Winston Hoyle, Clarkston, MI (US)

(73) Assignee: Divergent Technologies, Inc., Los Angeles, CA (US)

( * ) Notice: Subject to any disclaimer, the term of this patent is extended or adjusted under 35 U.S.C. 154(b) by 301 days.

(21) Appl. No.: 16/153,238

(22) Filed: Oct. 5, 2018

(65) Prior Publication Data

US 2020/0108870 A1 Apr. 9, 2020

(51) Int. Cl.
B60R 19/18 (2006.01)
B62D 21/15 (2006.01)
(Continued)

(52) U.S. Cl.
CPC ............ B62D 21/152 (2013.01); B29C 45/14 (2013.01); B29C 64/10 (2017.08); B33Y 10/00 (2014.12);
(Continued)

(58) Field of Classification Search
CPC .... B62D 21/152; F16F 7/003; F16F 2226/00; F16F 2224/0241; F16F 2224/0208;
(Continued)

(56) References Cited

U.S. PATENT DOCUMENTS 5,203,226 A 4/1993 Hongou et al.
5,742,385 A 4/1998 Champa
(Continued)

FOREIGN PATENT DOCUMENTS

WO 1996036455 A1 11/1996
WO 1996036525 A1 11/1996
(Continued)

OTHER PUBLICATIONS

US 9,202,136 B2, 12/2015, Schmidt et al. (withdrawn)
(Continued)

*Primary Examiner* — Pinel E Romain
(74) *Attorney, Agent, or Firm* — Arent Fox LLP

(57) ABSTRACT

Apparatus and methods for additively manufactured structures with augmented energy absorption properties are presented herein. Three dimensional (3D) additive manufacturing structures may be constructed with spatially dependent features to create crash components. When used in the construction of a transport vehicle, the crash components with spatially dependent additively manufactured features may enhance and augment crash energy absorption. This in turn absorbs and re-distributes more crash energy away from the vehicle's occupant(s), thereby improving the occupants' safety.

35 Claims, 12 Drawing Sheets

(51) Int. Cl.

| | |
|---|---|
| *F16F 7/00* | (2006.01) |
| *B60R 19/03* | (2006.01) |
| *B33Y 10/00* | (2015.01) |
| *B33Y 80/00* | (2015.01) |
| *B29C 45/14* | (2006.01) |
| *B29C 64/10* | (2017.01) |
| *B29L 31/30* | (2006.01) |
| *B29K 105/04* | (2006.01) |

(52) U.S. Cl.
CPC .............. *B33Y 80/00* (2014.12); *B60R 19/03* (2013.01); *B60R 19/18* (2013.01); *F16F 7/003* (2013.01); *B29K 2105/04* (2013.01); *B29L 2031/3044* (2013.01); *B60R 2019/186* (2013.01); *F16F 2224/0208* (2013.01); *F16F 2224/0241* (2013.01); *F16F 2226/00* (2013.01)

(58) Field of Classification Search
CPC ......... B29L 2031/3044; B29K 2105/04; B29C 45/14631; B29C 45/14795; B29C 45/0001; B29C 64/20; B29C 64/153; B29C 45/14; B29C 64/10; C23C 24/087; C23C 24/08; C23C 24/082; C22C 49/14; C22C 47/16; C22C 49/06; B22F 2999/00; B60R 2019/1853; B60R 19/023; B60R 19/02; B60R 19/03; B60R 19/18; B60R 2019/186; B33Y 30/00; B33Y 10/00; B33Y 80/00
USPC ......................................................... 293/102
See application file for complete search history.

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Lausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwäzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | Gangarao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |

(56) References Cited

U.S. PATENT DOCUMENTS

| | | |
|---|---|---|
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | Gangarao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | Tenhouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |

(56) References Cited

U.S. PATENT DOCUMENTS

| | | |
|---|---|---|
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2014/0277669 A1 | 9/2014 | Nardi et al. |
| 2016/0327113 A1 | 11/2016 | Shelley |
| 2017/0113344 A1 | 4/2017 | Schönberg |
| 2017/0203708 A1 | 7/2017 | Jaradi et al. |
| 2017/0341309 A1 | 11/2017 | Piepenbrock et al. |
| 2018/0186460 A1 | 7/2018 | Dardona et al. |
| 2018/0264719 A1* | 9/2018 | Rolland ............... A43B 13/181 |
| 2018/0265023 A1* | 9/2018 | Faruque ............... B29C 48/0021 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2017147499 A1 | 8/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Invitation to Pay Additional Fees received in PCT/US2019/054746 dated Nov. 27, 2019.
International Search Report & Written Opinion received in PCT/US2019/054746 dated Feb. 3, 2020.

\* cited by examiner

APPARATUS AND METHODS FOR ADDITIVELY MANUFACTURED STRUCTURES WITH AUGMENTED ENERGY ABSORPTION PROPERTIES

BACKGROUND

Field

The present disclosure relates generally to techniques for manufacturing structures with augmented energy absorption properties, and more specifically to additively manufacturing collision components of a transport vehicle.

Background

Three-dimensional (3D) printing, also referred to as additive manufacturing, has presented new opportunities to efficiently build components for automobiles and other transport structures such as airplanes, boats, motorcycles, and the like. Applying additive manufacturing processes to industries that produce these products has proven to produce a structurally more efficient transport structure. An automobile produced using 3D printed components may be made stronger, lighter, and consequently, more fuel efficient.

Safety is also a concern in transport structures. According to the Association for Safe International Road Travel (ASIRT), over one million people die worldwide in road crashes each year. Many factors contribute to fatal crashes, including, for example, various aspects of driver behavior and vehicle design. During a crash, the manner in which the occupant experiences acceleration due to impact crash energy may also determine the likelihood of survival. There is a need to improve vehicle safety by addressing the manner in which this crash energy is absorbed and distributed.

SUMMARY

Several aspects of techniques for additively manufacturing structures with augmented energy absorption properties will be described more fully hereinafter with reference to three-dimensional (3D) printing techniques.

In one aspect, a transport vehicle includes a first structure region, a second structure region, and an additively manufactured crash component. The additively manufactured crash component is positioned between the first structure region and the second structure region. The additively manufactured crash component includes at least one shell layer and a spatially dependent profile configured to absorb and re-distribute crash energy from at least one of the first and second structure regions.

The additively manufactured crash component may include a heat treated region configured to absorb the crash energy from the at least one of the first and second structure regions.

Load bearing components may enable transfer or diversion of loads to other components through defined load paths. Additively manufactured crash component, one the other hand, may be configured to absorb crash energy from the at least one of the first and second structure regions by absorbing an amount of crash energy, e.g., as the manufactured crash component undergoes controlled deformation. The amount of absorbed crash energy may be based upon the spatially dependent profile.

The spatially dependent profile may include a shell parameter. The shell parameter may be a shell thickness. The shell thickness may be configured to vary as a function of position. The shell parameter may be a shell density; the shell density may be configured to vary as a function of position. Additionally, in an aspect, spatially dependent profile may also be a function of the cross-sectional geometry, shape, or dimensions.

The spatially dependent profile may include a shell material.

The additively manufactured crash component may be configured to absorb the amount of crash energy based upon an intended air-bag deployment profile. The additively manufactured crash component may be configured to absorb the amount of crash energy based upon an intended deceleration profile.

The internal cavity may include foam. The foam may include a metal.

The additively manufactured crash component may be a frame crush rail.

In another aspect a method of additively manufacturing a crash component in a transport includes: forming a hollow region surrounded by a shell region; and controlling a shell region profile as a function of position.

Controlling the shell region profile may include varying a shell thickness. Controlling the shell region profile may include varying a material density. Controlling the shell region profile may include varying a material of the shell region. Additionally, in an aspect, spatially dependent profile may also be a function of the cross-sectional geometry, shape, or dimensions.

The method of additively manufacturing a crash component in a transport vehicle may further include injecting a foam into the hollow region.

In another aspect a transport vehicle includes an additively manufactured crash component. The additively manufactured crash component includes an internal hollow region and a shell. The shell has a variable cross section profile.

The additively manufactured crash component may further include at least one additively manufactured reinforcement element.

The variable cross section profile may be configured to enhance deformation mode and energy absorption capacity. The variable cross section profile may include a gauged thickness. The gauged thickness may be a function of a length of the crash component.

The variable cross section profile may include at least one crush initiation feature. The crush initiation feature may be configured to initiate a structural collapse of the additively manufactured crash component during an impact event.

The at least one crush initiation feature may be configured to initiate a structural collapse of the additively manufactured crash component during an impact event via a geometrical variation. The at least one crush initiation feature may be configured to initiate a structural collapse of the additively manufactured crash component during an impact event via a material variation. The at least one crush initiation feature may be an additively manufactured feature based upon a print parameter of a three dimensional (3D) printer.

The additively manufactured crash component may be configured to substantially absorb an amount of impact energy during the impact event. The additively manufactured crash component may be configured to substantially absorb and re-distribute an amount of impact energy away from an occupant of the transport vehicle during an impact event.

In another aspect a method of gauging a support structure in a transport vehicle includes: forming a hollow region surrounded by a shell region; and controlling a cross section profile as a function of position.

Controlling the cross section profile as a function of position may include controlling the cross section profile as a function of position. The cross section profile may be controlled as a function of position so as to enhance deformation mode and energy absorption capacity.

Controlling the cross section profile as a function of position may include varying a thickness of the cross section profile as a function of position. Varying a thickness of the cross section profile as a function of position may include placing at least one crush initiator at a select position within the cross section profile.

In another aspect a transport vehicle includes an additively manufactured crash structure. The additively manufactured crash structure includes a target impact location and an additively manufactured open cell structure located at the target impact location.

The additively manufactured crash structure may be positioned at the front of the transport vehicle. The target impact location may be the front of the additively manufactured crash structure.

The additively manufactured crash structure may be positioned at the rear of the transport vehicle. The target impact location may be the rear of the additively manufactured crash structure.

The additively manufactured open cell structure may include a lattice. The lattice may include a variable lattice density as a function of distance from the target impact location; and the variable lattice density may be least at the target impact location.

The additively manufactured lattice structure may be a bumper.

In another aspect a method of additively manufacturing a crash structure includes: defining a target impact location on the crash structure; and forming an open cell structure at the target impact location.

Forming an open cell structure at the target impact location may include additively manufacturing at least one reinforcement structure. Forming an open cell structure at the target impact location may include additively manufacturing a lattice concurrently with the at least one reinforcement structure.

Additively manufacturing the lattice may include varying a density of the lattice such that the density is least at the target impact location. Injecting foam into the lattice may occur after the additively manufacturing of the lattice.

It will be understood that other aspects of additively manufacturing structures with augmented energy absorption properties will become readily apparent to those skilled in the art from the following detailed description, wherein it is shown and described only several embodiments by way of illustration. As will be appreciated by those skilled in the art, the additively manufacturing structures with augmented energy absorption properties may be realized with other embodiments without departing from the invention. Accordingly, the drawings and detailed description are to be regarded as illustrative in nature and not as restrictive.

BRIEF DESCRIPTION OF THE DRAWINGS

Various aspects of techniques for additively manufacturing structures with augmented energy absorption properties will now be presented in the detailed description by way of example, and not by way of limitation, in the accompanying drawings, wherein.

DETAILED DESCRIPTION

Figure 1A:
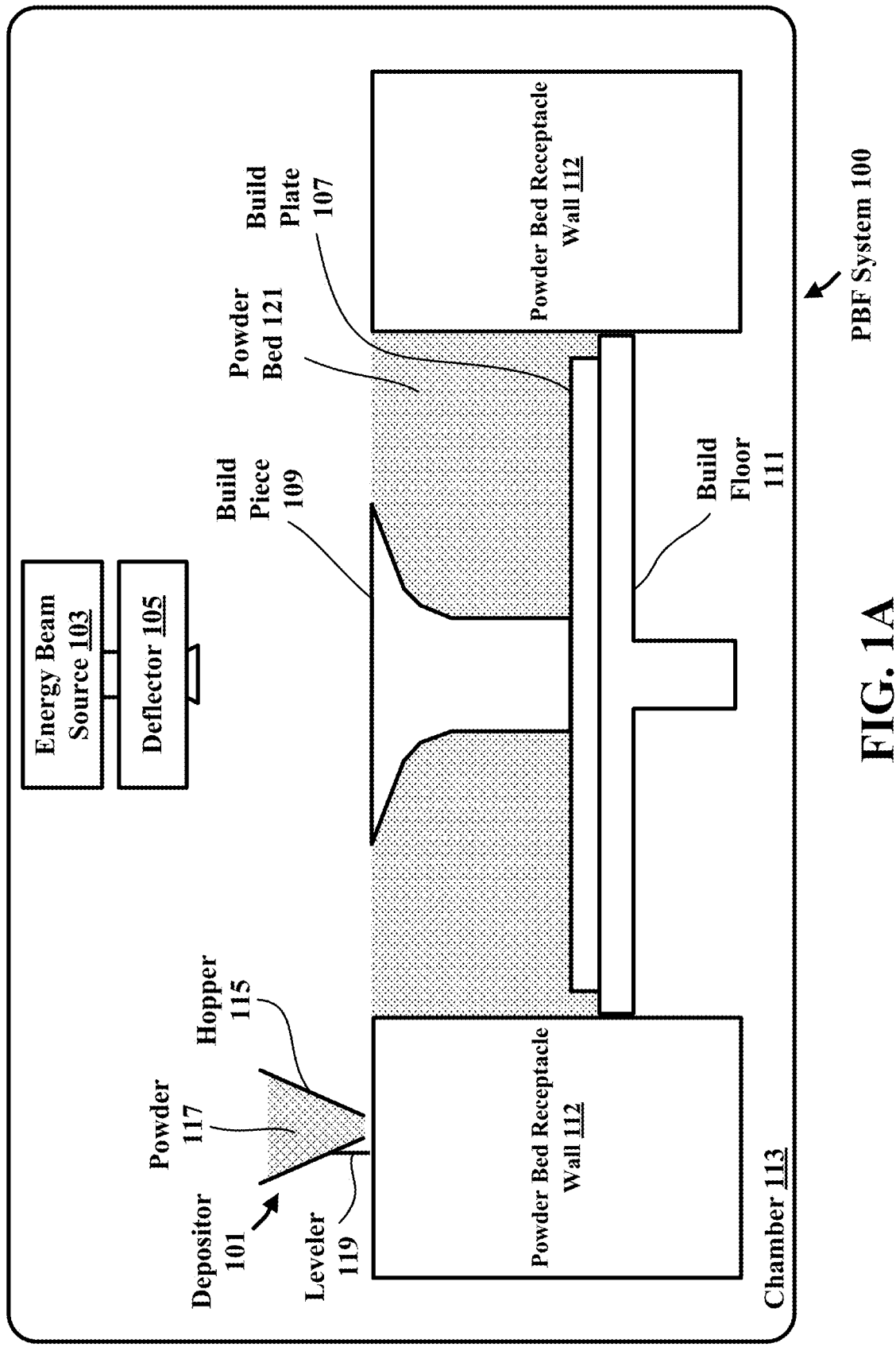
FIGS. 1A-D illustrate an example 3-D printer system during different stages of operation.

The detailed description set forth below in connection with the drawings is intended to provide a description of exemplary embodiments of additively manufacturing structures with augmented energy absorption, and it is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of 3-D printing provides significant flexibility for enabling manufacturers of mechanical structures and mechanized assemblies to manufacture complex parts. Additive manufacturing may enable techniques for manufacturing structures with augmented energy absorption properties, and more specifically to additively manufacturing collision components of a transport vehicle. For example, 3-D printing techniques provide manufacturers with the flexibility to design and build parts having energy absorption properties, which may be used for collision components of a transport vehicle.

FIGS. 1A-D illustrate respective side views of an exemplary 3-D printer system. In this example, the 3-D printer system is a powder-bed fusion (PBF) system 100. FIGS. 1A-D illustrate PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 may include a depositor 101 that may deposit each layer of metal powder, an energy beam source 103 that may generate an energy beam, a deflector 105 that may apply the energy beam to fuse the powder material, and a build plate 107 that may support one or more build pieces, such as a build piece 109. PBF system 100 may also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 may progressively lower build plate 107 so that depositor 101 may deposit a next layer. The entire mechanism may reside in a chamber 113 that may enclose the other components, thereby protecting the equipment, enabling atmospheric and temperature regulation and mitigating contamination risks. Depositor 101 may include a hopper 115 that contains a powder 117, such as a metal powder, and a leveler 119 that may level the top of each layer of deposited powder.

Referring specifically to FIG. 1A, this figure illustrates PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
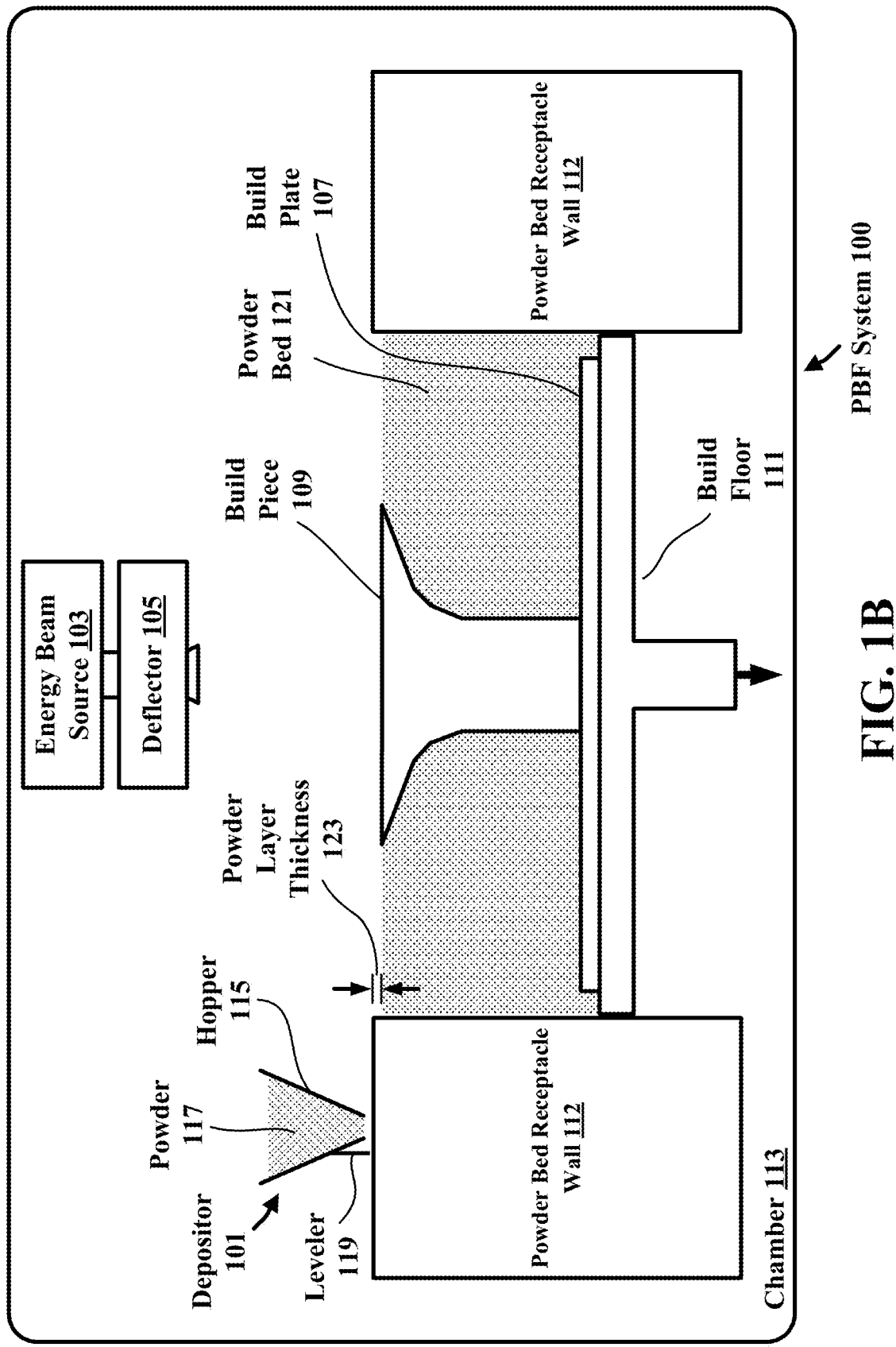

FIG. 1B illustrates PBF system 100 at a stage in which build floor 111 may lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 may be created over the top of build piece 109 and powder bed 121.

Figure 1C:
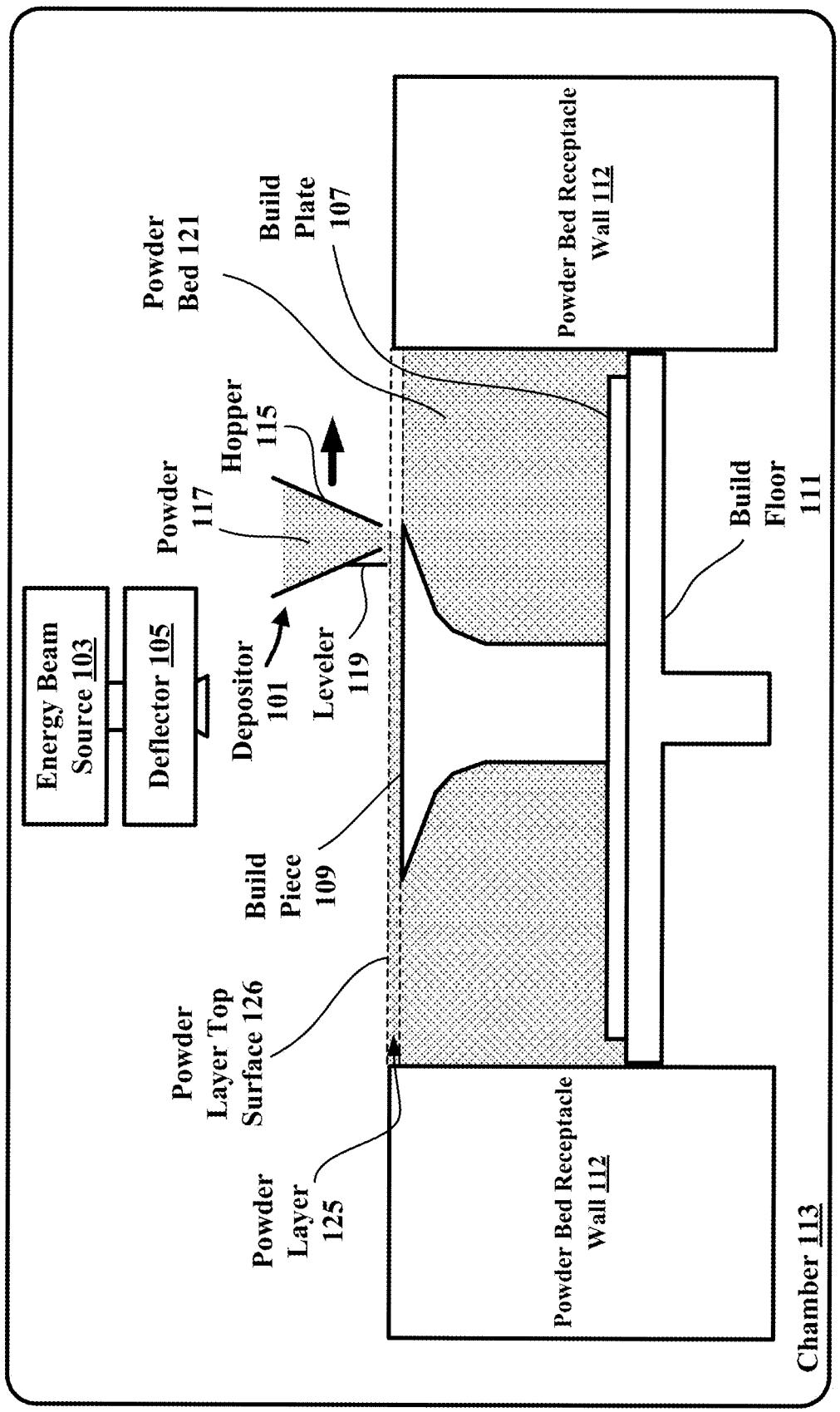

FIG. 1C illustrates PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 may level the released powder to form a powder layer 125 that has a thickness substantially equal to the powder layer thickness 123 (see FIG. 1B). Thus, the powder in a PBF system may be supported by a powder material support structure, which may include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving 150 previously-deposited layers discussed above with reference to FIG. 1A.

Figure 1D:
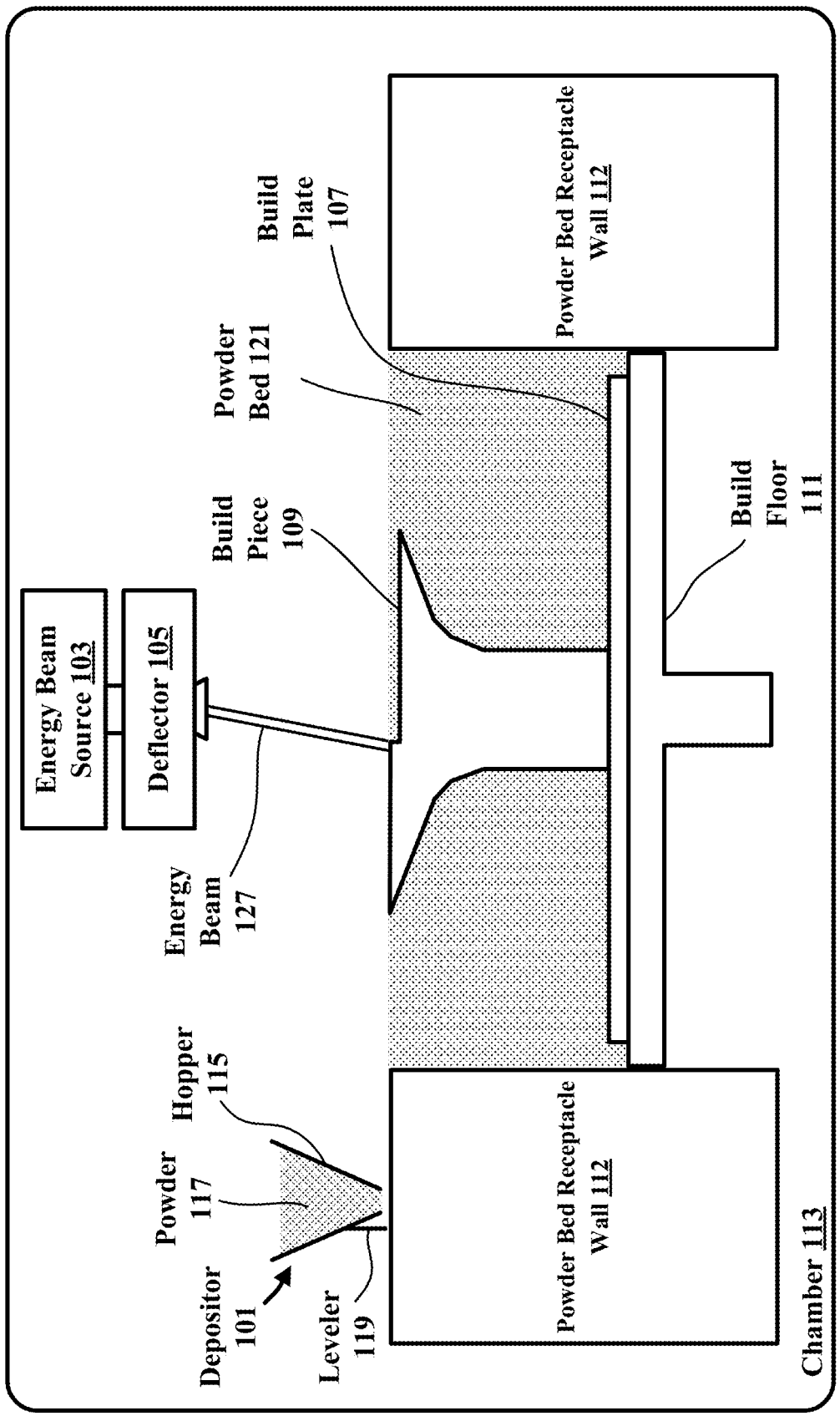

FIG. 1D illustrates PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 may be an electron beam source, in which case energy beam 127 constitutes an electron beam. Deflector 105 may include deflection plates that may generate an electric field or a magnetic field that selectively deflects the electron beam to cause the electron beam to scan across areas designated to be fused. In various embodiments, energy beam source 103 may be a laser, in which case energy beam 127 is a laser beam. Deflector 105 may include an optical system that uses reflection and/or refraction to manipulate the laser beam to scan selected areas to be fused.

In various embodiments, the deflector 105 may include one or more gimbals and actuators that may rotate and/or translate the energy beam source to position the energy beam. In various embodiments, energy beam source 103 and/or deflector 105 may modulate the energy beam, e.g., turn the energy beam on and off as the deflector scans so that the energy beam is applied only in the appropriate areas of the powder layer. For example, in various embodiments, the energy beam may be modulated by a digital signal processor (DSP).

The use of additive manufacturing in the context of additively manufacturing structures with augmented energy absorption properties provides significant flexibility and cost saving benefits that enable manufacturers of mechanical structures and mechanized assemblies to manufacture parts with complex geometries at a lower cost to the consumer. The manufacturing techniques described in the foregoing relate to structurally designing components to improve their ability of absorbing the crash energy and undergoing controlled deformation, thereby reducing the crash pulse borne by the occupants of the vehicle, and preventing intrusion into the occupant compartment. In some instances, processes for manufacturing components may include both additively manufactured parts and commercial off the shelf (COTS) components.

During a vehicle crash, collision (impact) pulse transmits through the vehicle components. When the impact energy is not properly absorbed by the crash structure, the crash pulse represents a danger to the occupants of the vehicle. Crash pulse transmission to vehicle occupants (i.e. the passenger(s) and/or the driver), depend upon the design of the vehicle's structure, components, and chassis. Accordingly, there is a need to design a vehicle's components to absorb and/or to reduce the transmission of crash pulse to the occupant. This need carries over into, among other arenas, the design of vehicles using additively manufactured components and structures.

Apparatus and methods for additively manufactured structures with augmented energy absorption properties are presented herein. Three dimensional (3D) additive manufacturing structures may be constructed with spatially dependent features to create crash components. When used in the construction of a transport vehicle, the crash components with spatially dependent additively manufactured features may enhance and augment crash energy absorption. This in turn reduces the peak of the crash pulse, thereby improving the occupants' safety.

Figure 2A:
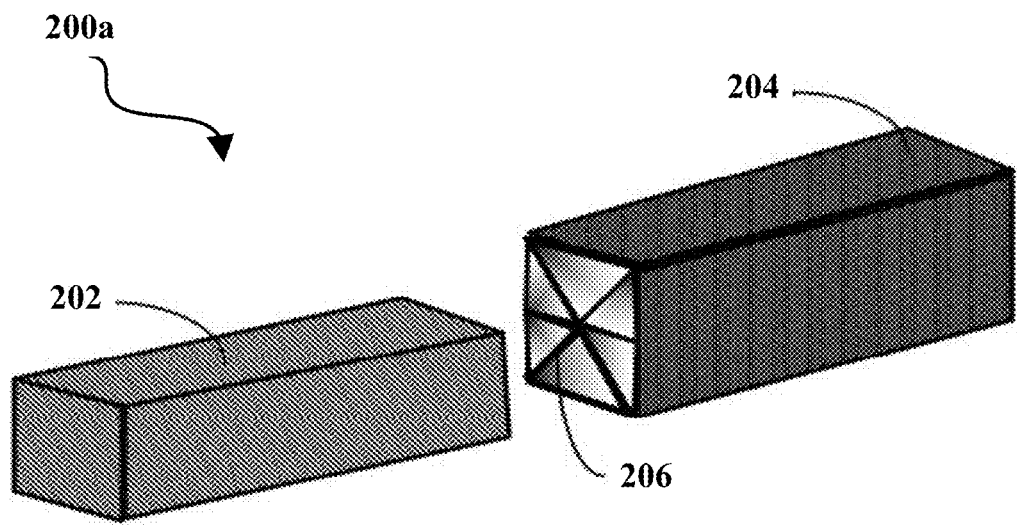
FIG. 2A illustrates a side view perspective of an additively manufactured crash component prior to inserting a foam block according to an embodiment.
Figure 2B:
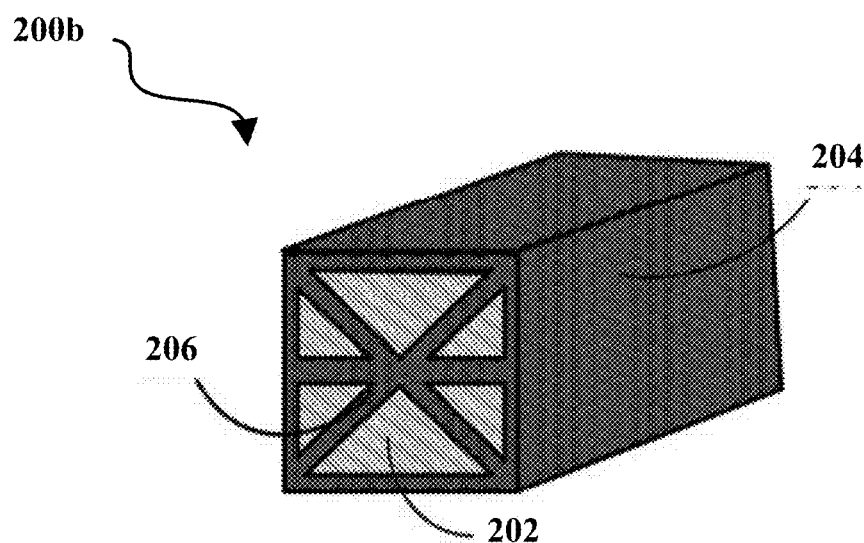
FIG. 2B illustrates a front view perspective of the additively manufactured crash component after inserting the foam block according to the embodiment of FIG. 1A.

FIG. 2A illustrates a side view perspective 200a of an additively manufactured crash component 204 prior to inserting a foam block 202 according to an embodiment. FIG. 2B illustrates a front view perspective 200b of the additively manufactured crash component 204 after inserting the foam block 202. As shown in FIG. 2A, the crash component 204 may be hollow with a shell-like exterior and have an internal lattice 206 to provide structural support.

During manufacture, in order to insert the foam block 202 into the hollow regions of the crash component 204, the crash component 204 may be heated. In this way the foam block 202 may soften upon contact with crash component 204 and flow around the internal lattice 206. Once the temperature is reduced, the foam block 202 may re-solidify to fill the interior hollow regions of the crash component 204 as shown in FIG. 2B. The foam block 202 may include materials for enhancing support strength while enhancing the ability for the crash component to absorb crash energy. For instance, the foam block 202 may include metal materials and/or expanded polypropylene.

The crash component 204 may be a part of an automobile frame and/or structure and may provide an energy absorption region during a crash (impact) event. For instance, the crash component 204 may be part of an automobile frame crush rail or automobile chassis; and the crash component 204 may be an additively manufactured structure which is positioned between a first chassis region and a second chassis region to absorb crash energy. By absorbing crash energy, the crash component (structure) 204 may advantageously reduce the transmission of the crash force between the first and second chassis regions by absorbing it.

Although FIGS. 2A and 2B illustrate an embodiment in which the foam block 202 is inserted following heating of the crash components 204, other embodiments which do not require heating are possible. For instance, a foam may be injected without heat into some or all of the hollow region of the crash component 204. In this way some or all of the hollow region may be occupied by foam in order to tailor the manner in which the crash component 204 absorbs crash energy during an impact event.

In addition to having the lattice 206, the crash component 204 may have additional geometrical features made possible during the 3D printing process. For instance, during the 3D printing process, a spatially dependent profile may be additively manufactured into the crash component 204. In this way the crash component 204 may advantageously be tailored with 3D print parameters, materials, and geometrical variations to enhance the structural properties for absorbing crash energy.

Figure 3A:
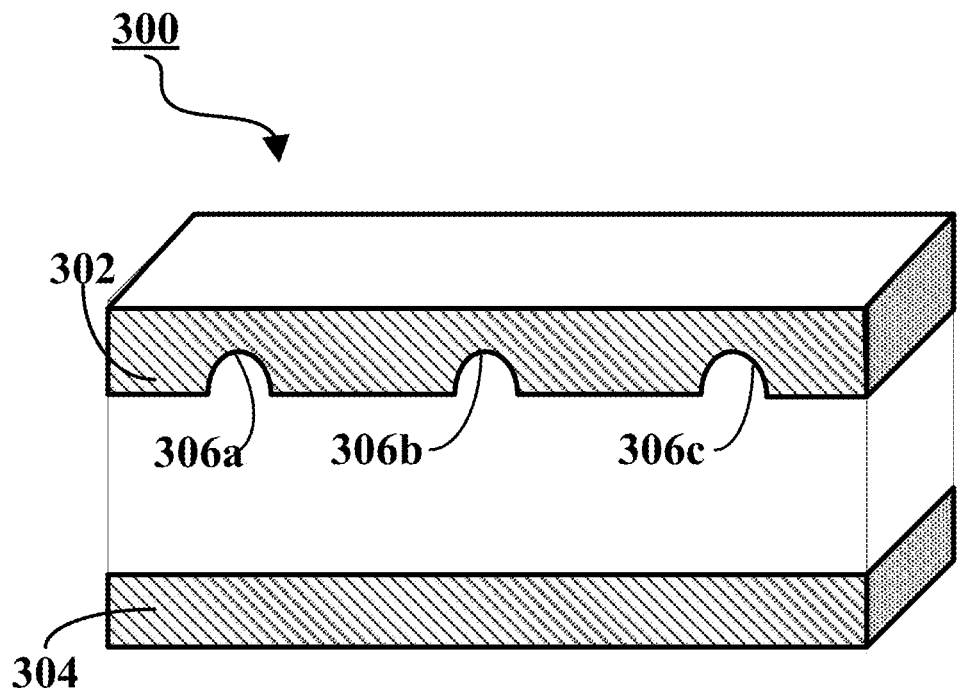
FIG. 3A illustrates a side view perspective of a structurally gauged crash component according to an embodiment.
Figure 3B:
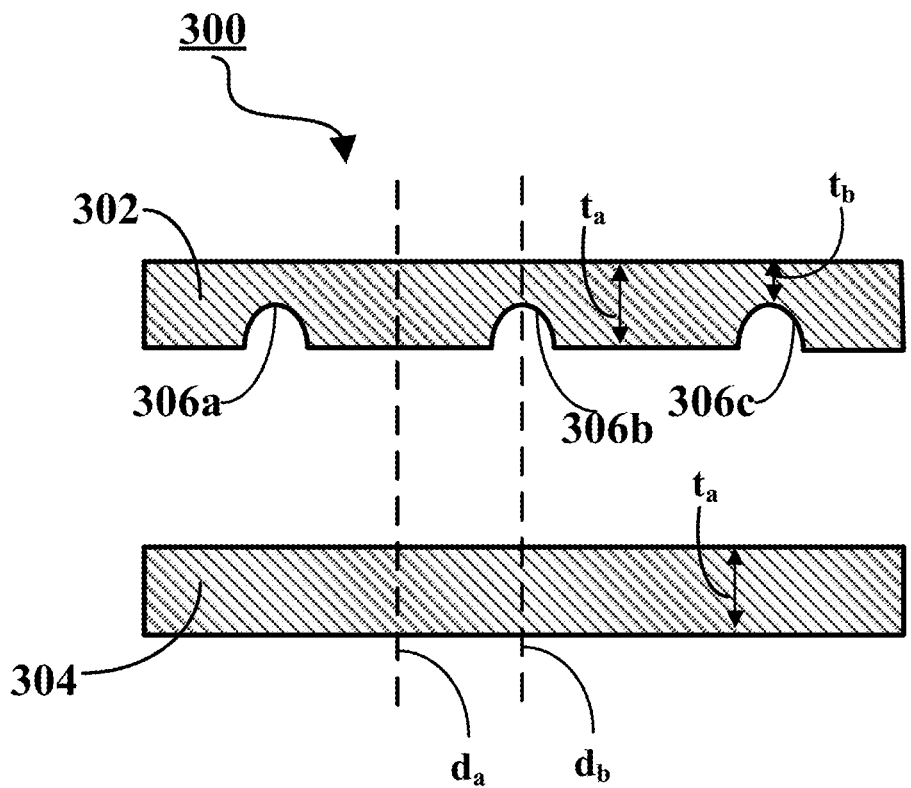
FIG. 3B illustrates a two dimensional representation of the structurally gauged crash component according to the embodiment of FIG. 2A.

FIG. 3A illustrates a side view perspective and FIG. 3B illustrates a two dimensional representation of a structurally gauged crash component 300 according to an embodiment. Structural gauging is when the thickness of a part is varied across the part's cross-section to obtain a required structural performance. As shown in FIGS. 3A and 3B, the crash component 300 has a top shell layer 302 and a bottom shell layer 304. The crash component 300 may be an additively manufactured crash component similar to that of FIGS. 2A and 2B, except additional geometrical and material features may be varied during the 3D printing process in order to tailor and enhance the crash energy absorption properties.

Figure 3C:
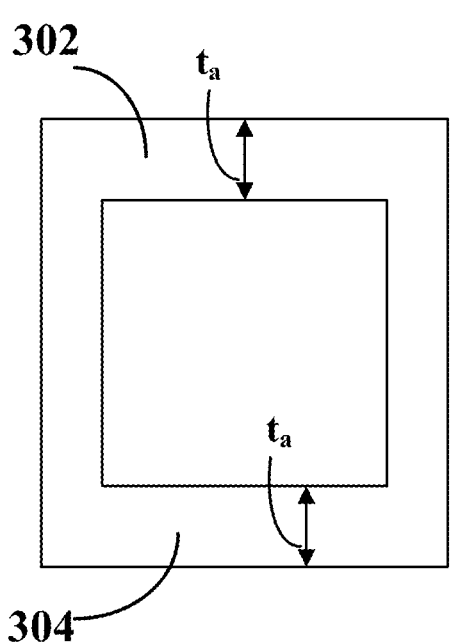
FIG. 3C illustrates a first cross section of the structurally gauged crash component according to the embodiment of FIG. 2A.
Figure 3D:
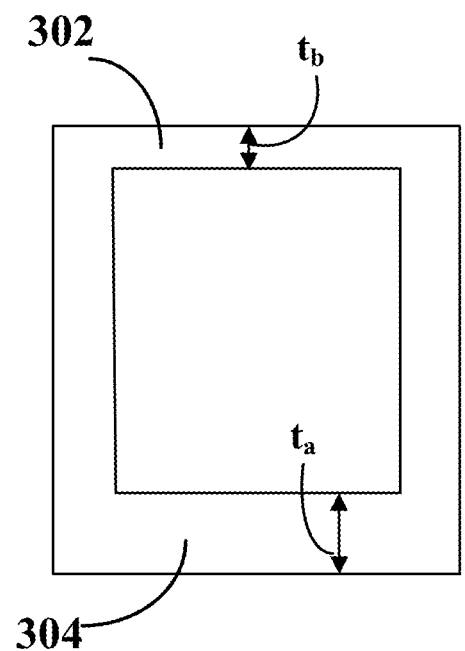
FIG. 3D illustrates a second cross section of the structurally gauged crash component according to the embodiment of FIG. 2A.

The shell thickness of the top shell layer 302 may be varied as a function of distance by forming the notches 306a-c. In the embodiment shown, the shell thickness of the bottom shell layer 304 is constant, although this need not be the case. The notches of the top shell layer 302 may be formed so that during a crash (impact) event, the crash component 300 may crush or deform initially at one or more of the notches 306a-c. In this way the spatial profile of the crash component 300 is tailored to incorporate a crush initiation feature, also referred to as crush initiator. The crush initiation feature or crush initiator may be a cutout or indent, for example. During a crash, the crush initiation feature may provide a controlled energy absorption crush location where the crash energy, or a substantial amount of crash energy, is absorbed into the crash component 300. Controlling the crash energy via crush initiation features may save lives by absorbing and re-distributing energy away from passengers and/or occupants of the automobile or transport structure. In an aspect, the crush initiators, e.g., notches may be along the outer surface of the component FIG. 3C illustrates a first cross section of the structurally gauged crash component 500 delineated by the line $d_a$ of FIG. 3B, and FIG. 3D illustrates a second cross section delineated by the line $d_b$ drawn through the notch 306b in FIG. 3B. As illustrated by the cross sections of FIGS. 3C and 3D, the top shell layer 302 and the bottom shell layer 304 may be part of continuous shell region. In the shell region delineated by the line $d_a$, the top shell layer 302 has thickness $t_a$, and the bottom shell layer 304 has thickness $t_a$ (see also FIG. 3B). In the shell region delineated by the line $d_b$, the top shell layer 502 has thickness $t_b$ inside the notch 306b, and the bottom shell layer 304 has thickness $t_a$. By additively manufacturing the notch 306b to have thickness $t_b$ less than thickness $t_a$, the notch 306b may enhance the energy absorption properties of the manufactured crash component 300. For instance, as shown in FIG. 3E, the energy absorption properties may be tailored to reduce a net acceleration experienced by the transport vehicle's occupant(s).

Although FIGS. 3A-3D illustrate the crash component 300 as using structurally gauged notches 306a-c in the top shell layer 302 to implement crush initiation features; other embodiments are possible. In addition to notches 306a-c, other parameters, or shell parameters, may be varied during the additive manufacturing process to form a spatially dependent crash structure profile. In some embodiments fewer or greater notches may be used. In other embodiments, the material properties including shell density and/or shell material may be varied during the additive manufacturing process. For instance, the crash component 300 may use one alloy of material in one region while using another alloy in an adjacent region. In an alternative embodiment, one or more of the notches 306a-c may also have a different shape than the curved shape shown. For example, stair-stepped shapes, notched shapes, triangular shapes, rectangular shapes, or numerous other geometrical configurations may be possible as described in certain examples below.

Additionally, the notches may be formed in a manner which maintains the structural integrity of the crash component 300. For instance, during normal operation the crash component 300 may provide structural stability within the framework of an automobile or transport vehicle so as to enhance a load bearing strength. Additionally, the crash structure may be tailored to reduce mass. In this way the additively manufactured crash component 300 may advantageously enhance a load bearing strength to mass ratio and/or figure of merit.

Figure 3E:
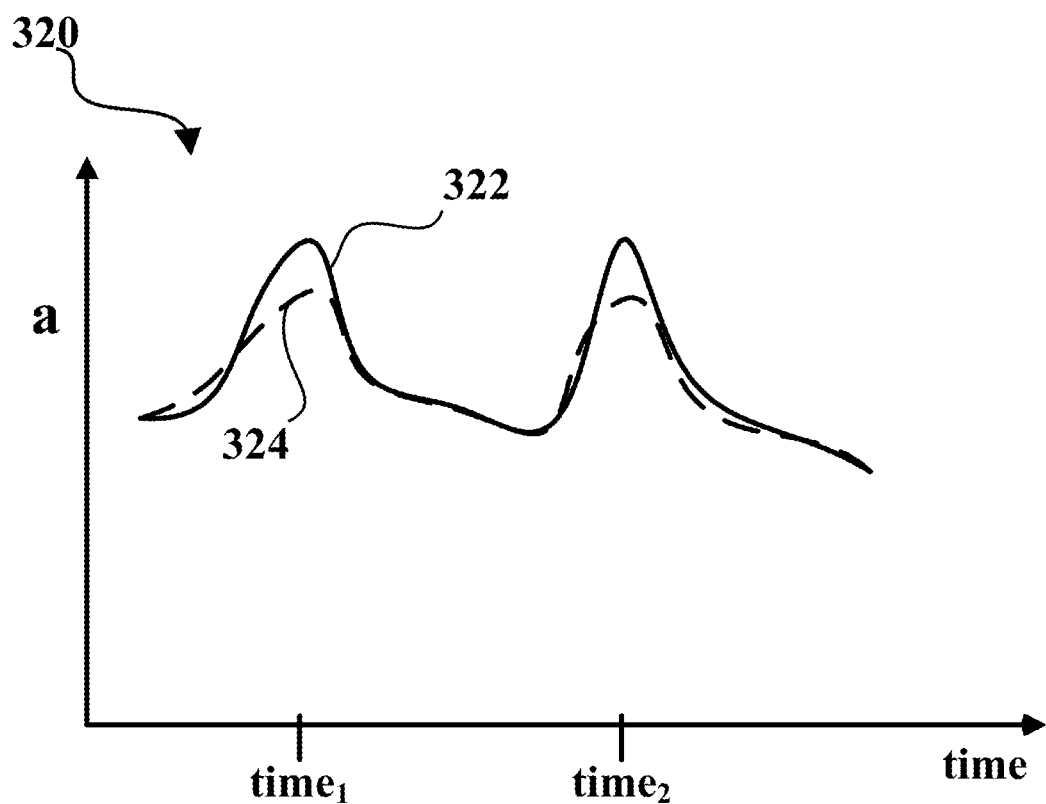
FIG. 3E illustrates a graph of acceleration versus time plots relating to a structurally gauged crash component according to the embodiment of FIG. 2A.

FIG. 3E illustrates a graph 320 of acceleration versus time plots 322 and 324 relating to the structurally gauged crash component 300. Plot 322 may represent the acceleration profile experienced by an occupant in a vehicle during a crash without a crash component installed, and plot 324 may represent the acceleration profile experienced by the occupant when the crash component 300 is installed in part of the vehicle's structure or frame. As shown in FIG. 3E, the crash component 300 enhances energy absorption in a manner which reduces the net acceleration peaks at times labeled time$_1$ and time$_2$. This reduction in peak acceleration indicates that crash pulse experienced by the occupant is reduced, thereby improving the occupant's chances of survival.

Although the crash component 300 of FIGS. 3A-3D has been tailored to reduce peaks of a deceleration profile experienced during a crash, other profiles may be used. For instance, the crash component 300 may be tailored to absorb energy based upon an intended air-bag deployment profile. Alternatively and additionally, the manufactured crash structure may be configured to absorb an amount of crash energy based upon alternative deceleration profiles having greater or fewer peaks.

Figure 4A:
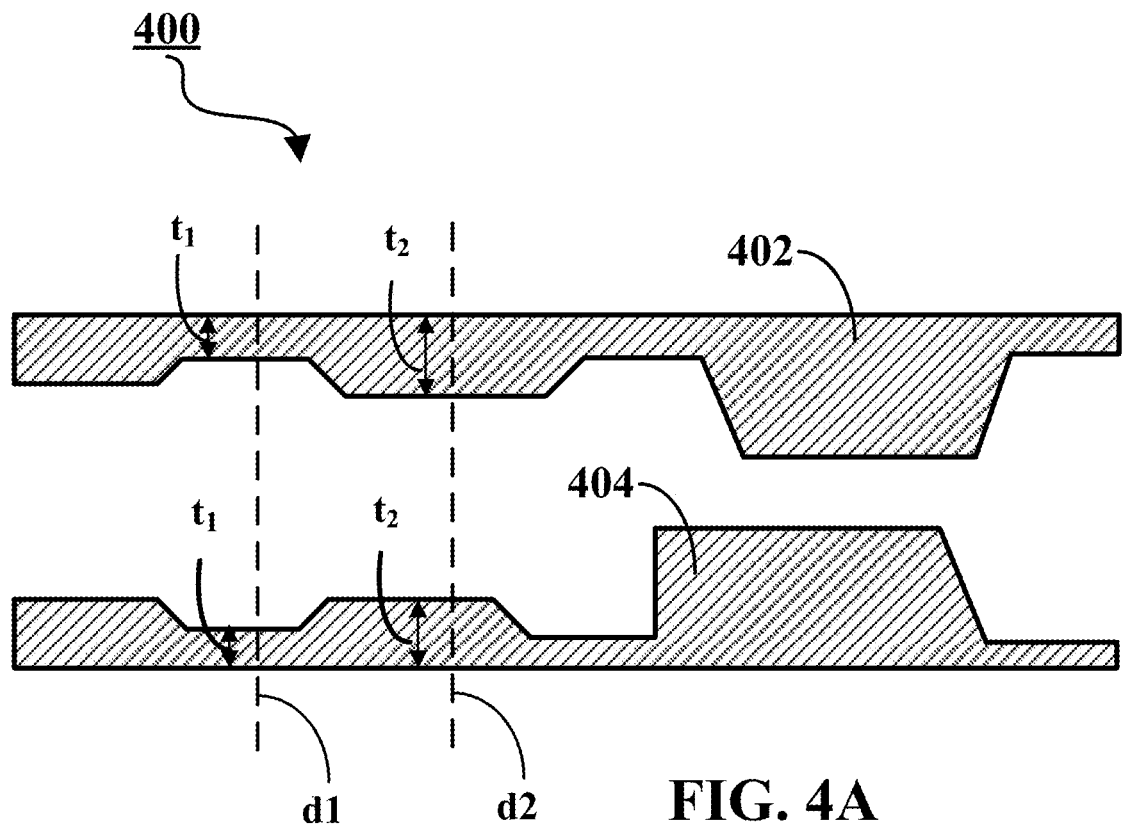
FIG. 4A illustrates a two dimensional representation of a structurally gauged crash component according to another embodiment.

FIG. 4A illustrates a two dimensional representation of a structurally gauged crash component 400 according to another embodiment. The crash component 400 is similar to the crash component 300, except the spatially dependent profile is additively manufactured to have a different geometry. For instance, unlike the crash component 300, the crash component 400 does not have notches 306a-c. Instead, the crash component 400 is additively manufactured with a top shell layer 402 and a bottom shell layer 404, both having a variable spatially dependent profile. The shell thickness may be additively manufactured so that the top shell layer 402 and the bottom shell layer 404 form a structure with enhanced load bearing strength to mass ratio and/or figure of merit. Having variable thickness may advantageously tailor the crash component 400 to absorb a substantial amount of crash energy; additionally the crash energy may be absorbed in a manner which follows a desired deceleration profile.

Figure 4B:
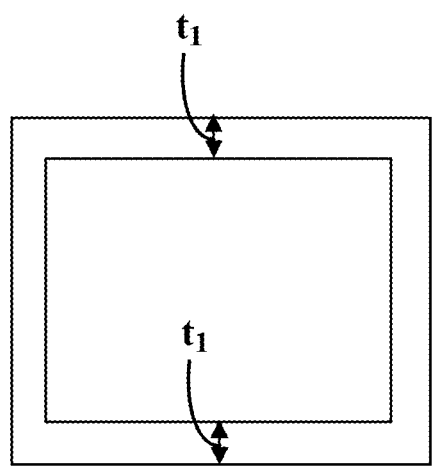
FIG. 4B illustrates a first cross section of the structurally gauged crash component according to the embodiment of FIG. 3A.

FIG. 4B illustrates a first cross section of the structurally gauged crash component 400 delineated by the line $d_1$ of FIG. 4A, and FIG. 4B illustrates a second cross section delineated by the line $d_2$ of FIG. 4A. As shown the cross section profile delineated by the line $d_1$ may have a shell profile with shell thickness $t_1$; and the cross section profile delineated by the line $d_2$ may have a shell profile with shell thickness $t_2$ greater than $t_1$. In an aspect, variable thickness may be achieved by additively manufacturing a structure. Because additively manufacturing is used, no secondary operation needs to be performed and no tooling is required for the variable thickness profiles to be achieved in the structure.

Figure 4C:
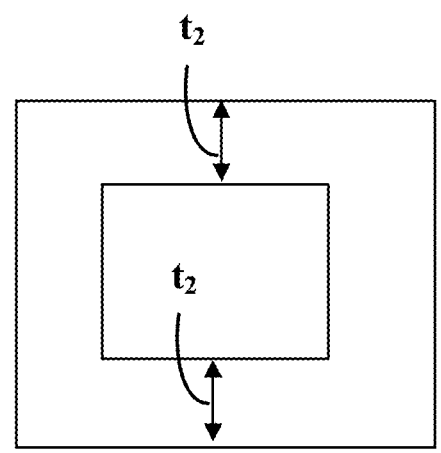
FIG. 4C illustrates a second cross section of the structurally gauged crash component according to the embodiment of FIG. 3A.

Although FIGS. 4A-4C illustrate a crash component 400 with spatially dependent profiles represented by shell thickness variations; other configurations are possible. For instance, in other configurations a shell material density may be varied; alternatively, a shell material or alloy may be varied a function of position. These alternative configurations are deemed to fall within the scope of the present disclosure.

Additionally, alternative structures other than closed shell structures may be used to make crash components. For instance, skeletal features and rib (reinforcement) features may be additively manufactured into a transport structure. These reinforcement features may also be additively manufactured to have spatially dependent profiles for enhancing crash energy absorption. Also, crash component features and elements may be co-printed at the same time. For instance, a reinforcement feature may be concurrently printed with a lattice feature within a crash component.

Figure 5:
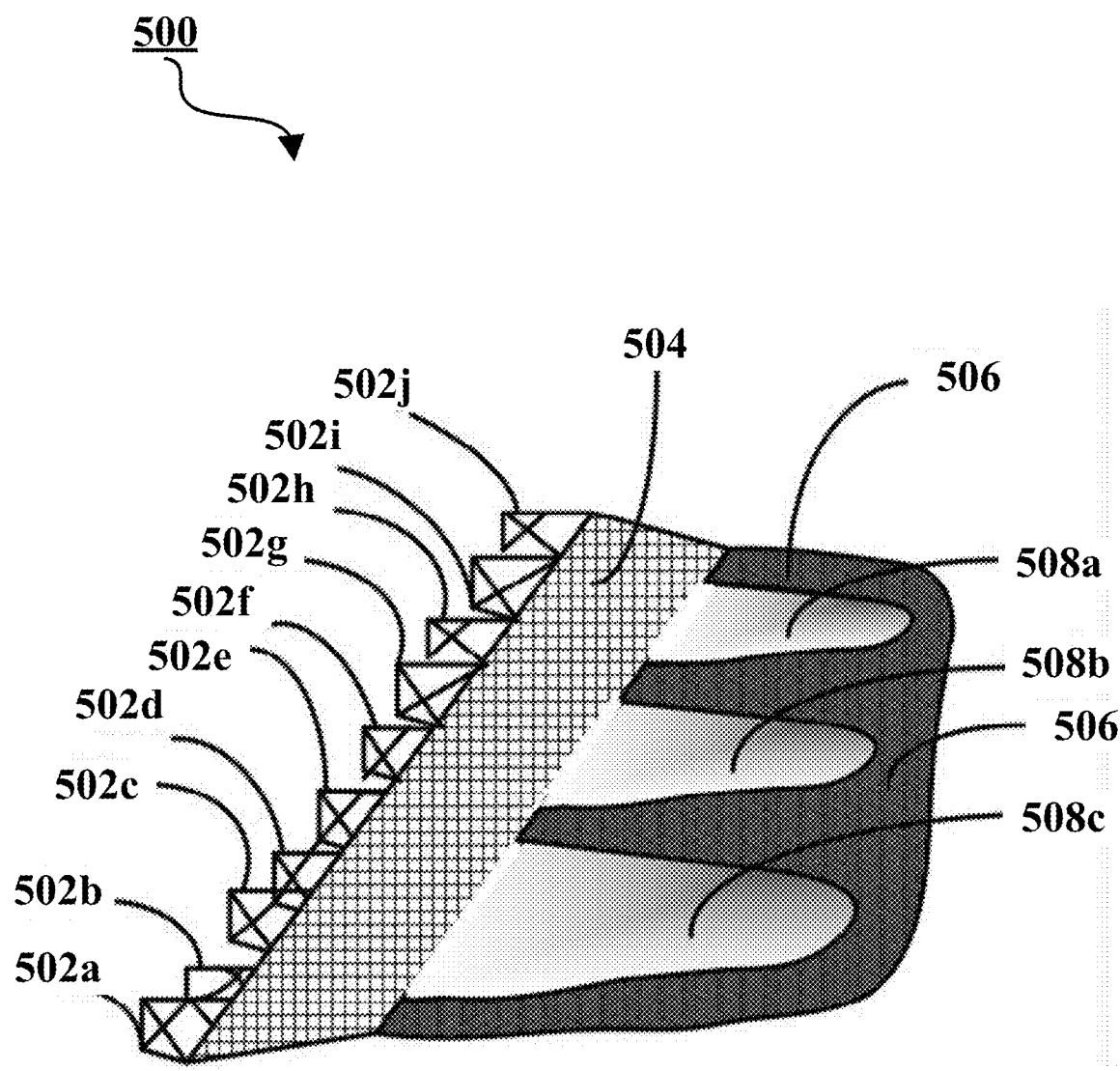
FIG. 5 illustrates an additively manufactured bumper according to an embodiment.

FIG. 5 illustrates a cross-sectional view of an additively manufactured bumper 500 according to an embodiment. The additively manufactured bumper has a support region 506 with hollow sections 508a-c. Adjacent the support region 506 is an additively manufactured lattice 504 having a first lattice density; and in front of the bumper is a series of additively manufactured lattice elements 502a-j having a second lattice density less than the first lattice density. The additively manufactured bumper may be placed in the front or rear of a transport vehicle so that during a crash, the lattice elements 502a-j may absorb energy first by being located closest to the point of impact. In the event of an impact with a pedestrian, such an architecture would prevent significant harm to the pedestrian. Having a series of lattice elements 502a-j with lower density at the impact location may advantageously absorb energy and reduce the crash pulse transmitted to either the occupants of the vehicle, or the pedestrian being impacted. The higher density lattice 504 may further absorb crash energy before it reaches the support region 506. Having hollow sections 508a-c may further reduce mass of the bumper structure while maintaining a high load bearing strength to mass ratio and/or figure of merit.

Although the additively manufactured bumper 500 shows an embodiment using an additively manufactured lattice 504 of a first lattice density and a series of lattice elements 502a-j of a second density located at a defined impact location, other configurations are possible. For instance, additional lattice regions of variable densities may be included between the series of lattice elements 502a-j and the support region 506. Also, greater or fewer hollow sections 508a-c may be included within the support region 506. In addition to having lattice elements 502a-j, skeletal features may also be implemented with reinforcement sections which may be concurrently printed with the lattice elements 502a-j. In other embodiments, foam may be injected into the lattice regions to enhance energy absorption properties. These features disclosed in the illustrations above may be implemented individually, or combined in part or in whole to maximize the safety profile for the occupants in the vehicle or other transport structure.

Often energy absorbing structures may be used so that a catastrophic failure of a part may be controlled or avoided. For example, energy absorbing structures may be used so that the catastrophic failure of a part may be controlled under a crash load. In an aspect, higher energy absorbing structures may be additively manufactured. For example, higher energy absorbing structures may be additively manufactured, may be achievable by (1) additive deposition of a lower strength, higher ductility material at specific spots to act as a crumple initiator, (2) using a mandrel (plastic, metal) to create a structural lattice in the shape of a thin walled crash rail, (3) using specific high ductility, low yield materials placed strategically in the lattice, or (4) using multiple mixed materials in specific geometric patterns to cause crash energy to be directed to areas where conversion may take place.

Figure 6A:
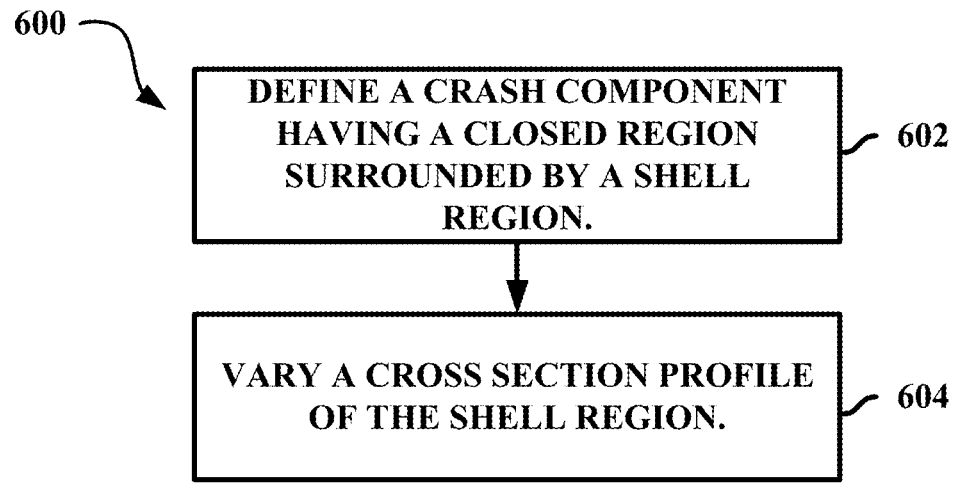
FIG. 6A illustrates a conceptual flow diagram for additively manufacturing closed shell crash structures according to the teachings herein.

FIG. 6A illustrates a conceptual flow diagram 600 for additively manufacturing closed shell crash structures (components) according to the teachings herein. In step 602 the additively manufactured crash component (structure) is defined to be a closed structure having a shell. The crash component may correspond to crash component 300 and/or crash component 400 and be defined to absorb crash energy based upon an occupant deceleration profile. The crash component may additionally be defined to have crush initiation features. In step 604 the shell cross section profile is varied using additive manufacturing. Shell parameters including thickness, material type, and density may be varied as a function of position.

Figure 6B:
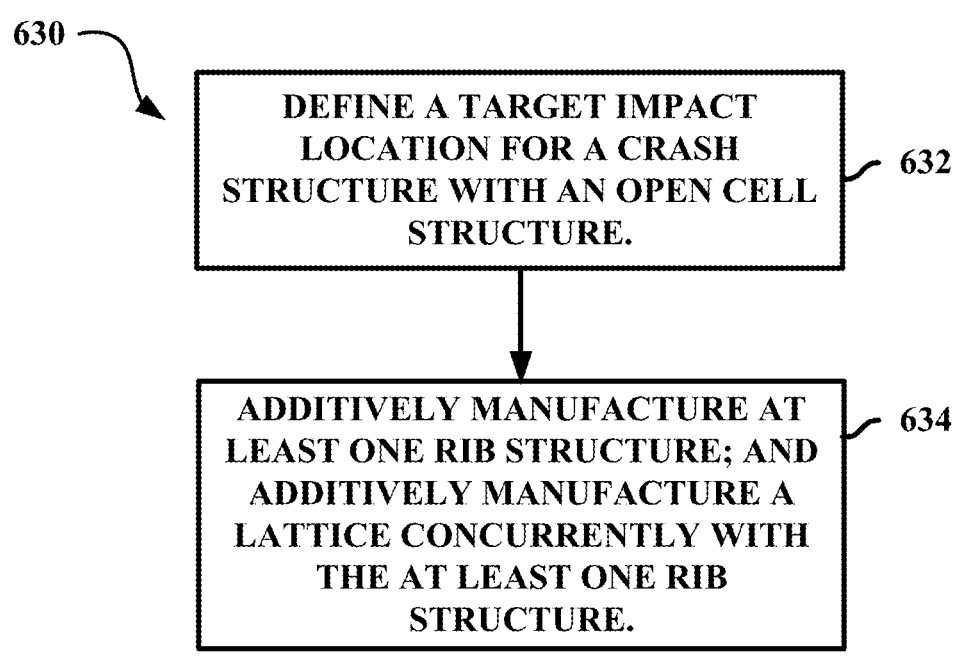
FIG. 6B illustrates a conceptual flow diagram for additively manufacturing open cell crash structures according to the teachings herein.

FIG. 6B illustrates a conceptual flow diagram 630 for additively manufacturing open cell crash structures (components) according to the teachings herein. Open cell crash components may include bumpers and structures created with open regions and reinforcement structures. In step 632 a target impact location for the crash structure having an open cell structure may be defined by using computational methods. In step 634 at least one reinforcement structure may be additively manufactured with a spatially dependent profile according to a deceleration profile; and a lattice may be concurrently co-printed with the reinforcement structure.

Figures 7A, 7B:
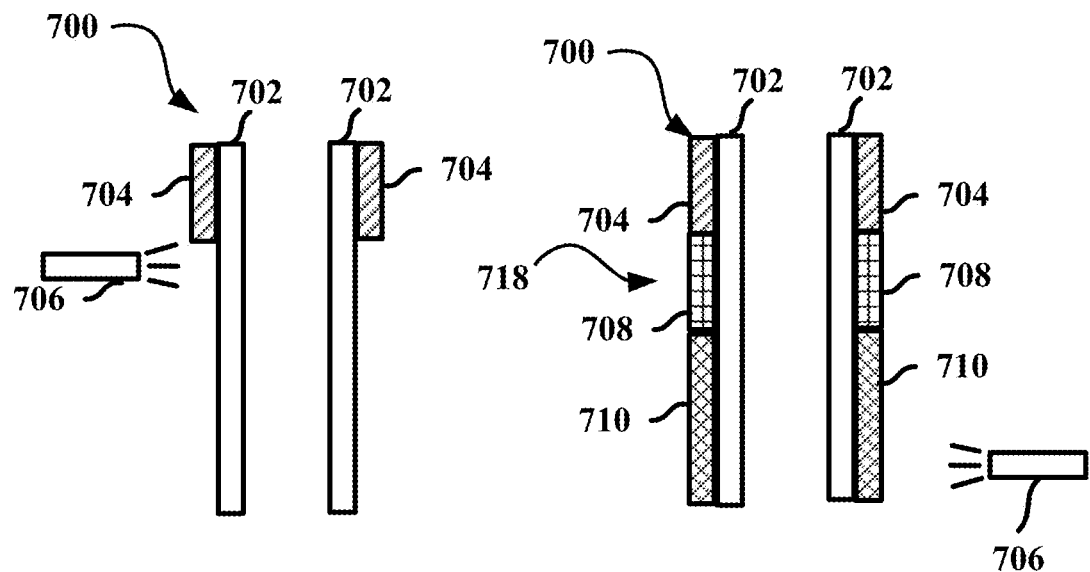
FIGS. 7A-7C illustrate an example cross section of a rectangular tube that may include an area that acts as a crumple initiator.
Figure 7C:
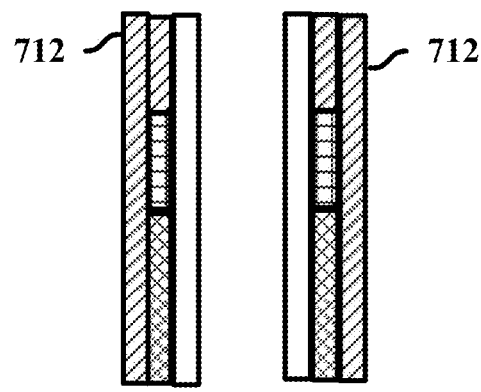

FIGS. 7A-7C illustrate an example cross section of a rectangular tube 700 that may include an area that acts as a crumple initiator 714. The rectangular tube 700 may include sides of an initial tube 702. Materials such as a first material 704, a second material 708, and a third material 710 may be additive deposited, e.g., using a cold spray nozzle 706. As discussed above, in one aspect, an additive deposition of a lower strength, higher ductility material at specific spots may be used to act as a crumple initiator 714. Optionally, the rectangular tube 700 may be coated with an external layer 712 made of first material 712. Examples of lower strength, higher ductility material that may be used may include, but are not limited to magnesium, copper, aluminum, titanium, iron, plastics, ceramics, or combinations thereof. The lower strength, higher ductility material may, however, be any material that is at least one of lower strength or higher ductility as compared to a material on to which the additive deposition is occurring. In an aspect, the additive deposition may be coldspray additive manufacturing, printer using a 3-D printer system, other additive manufacturing or some combination of these. (The example of FIGS. 7A-7C uses coldspray.) Coldspray is a manufacturing process wherein the material being deposited is kept below its melting point, configured to impact the base material at a speed high enough to induce solid state welding. The locations or spots where the lower strength, higher ductility material may be directed may be any area where a small increase in strength may provide a crumple initiator 718 or crumple location.

As discussed above, one aspect may additively deposit material on a standardized extrusion or other part to selectively strengthen some areas over other areas. For example, the initial tube 702 may be a standardized extrusion or other part. Selectively strengthening some areas over other areas may better control crumpling. For example, material 708 may be repeated multiple times to increase crumpling areas of a structure. Increased crumpling may increase energy absorption. For example, one aspect may coldspray material 708, 3-D printing material 708, or otherwise additively manufacturing materials 708 onto a standardized extrusion or other part to selectively strengthen some areas over other areas. In an aspect, coldspraying (or otherwise additively manufacturing) material onto a standardized extrusion or other parts may better control crumpling. For example, crumpling may be increased. Increased crumpling may increase energy absorption of a part having the increased crumpling.

As discussed above, one aspect may use a tube 702 that may be a hollow square composite tube (e.g. carbon fiber composite) and coldspray a strong ductile aluminum alloy on the outside to create a hybrid CFRP-aluminum crash rail. In an aspect, hollow square composite tube may be brittle, e.g., before the addition of the strong ductile aluminum alloy on the outside to create the hybrid CFRP-aluminum crash rail.

As discussed above, one aspect may use additive deposition. The additive deposition may be an additive deposition of metals with higher ductility and lower strength. The higher ductility and lower strength material may be, but is not limited to magnesium, copper, aluminum, titanium, iron, plastics, ceramics, or combinations thereof, for example. The higher ductility and lower strength material may be additive deposition through coldspray (or otherwise additively manufacturing). The higher ductility and lower strength material may be additive deposition at specific areas. The coldspray (or otherwise additively manufacturing) at specific areas may allow for tunable crumple propagation.

Figure 8A:
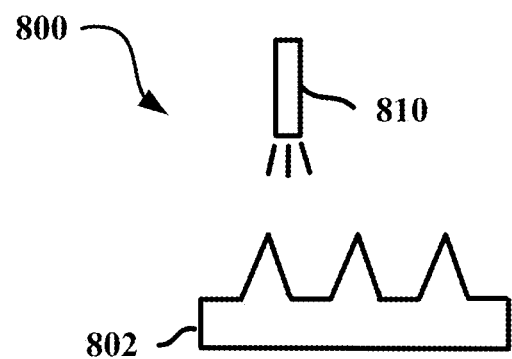
FIGS. 8A-8B are diagrams providing an example of a mandrel and a structural lattice that may be made using the mandrel.
Figure 8B:
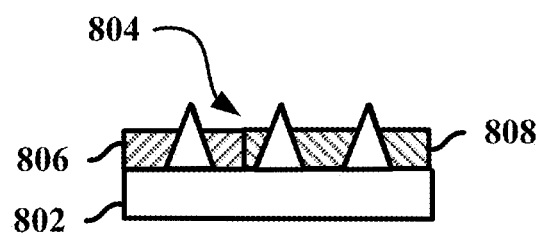

FIGS. 8A-8B are diagrams 800 providing an example of a mandrel 802 and a structural lattice 804 that may be made using the mandrel 802. In an aspect, the mandrel may be sacrificial. Accordingly, the mandrel may be removed after the deposition is complete in some examples. The structural lattice 804 may include a first material 806 and a second material 808. The first material 806 and the second material 808 may be cold spray deposited 810 (or otherwise additively manufactured).

As discussed above, one aspect may use of the mandrel 802 (e.g., of plastic, metal) to create the structural lattice 804 in the shape of a thin walled crash rail. The structural lattice 804 may be wrapped around, placed on, secured to, or otherwise coupled or connected to a structure (such as a tube). The structural lattice 804 may provide increased strength to the structure, e.g., tube. The increased strength to the structure may allow the structure to be used as a thin walled crash rail.

As discussed above, one aspect may increase a structural lattice's ability to absorb energy with specific high ductility, low yield materials placed strategically in the lattice 804. For example, the structural lattice 804 may be made of various materials, including, but not limited to magnesium, copper, aluminum, titanium, iron, plastics, ceramics, or combinations thereof. The material or materials used may provide the structural lattice 804 with the ability to absorb energy. The materials may be specific high ductility, low yield materials placed strategically in the lattice. The location of the materials within the structural lattice 804 may increase the structural lattice's 804 ability to absorb energy. As discussed above, one aspect may increase a structural lattice's 804 ability to absorb energy with multiple mixed materials in specific geometric patterns to cause crash energy to be directed to areas where conversion may take place.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing structures with augmented energy absorption properties. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An energy absorbing structure comprising:
a first structure region;
a second structure region; and
an additively manufactured crash component positioned between the first structure region and the second structure region, the additively manufactured crash component comprising at least one shell layer and a spatially dependent profile configured to absorb and re-distribute crash energy from at least one of the first and second structure regions.

2. The energy absorbing structure of claim 1, wherein the additively manufactured crash component comprises a heat treated region configured to absorb and re-distribute the crash energy from the at least one of the first and second structure regions.

3. The energy absorbing structure of claim 1,
wherein the additively manufactured crash component is configured to absorb and re-distribute crash energy from the at least one of the first and second structure regions by absorbing an amount of crash energy; and
wherein the amount of crash energy is based upon the spatially dependent profile.

4. The energy absorbing structure of claim 3, wherein the spatially dependent profile comprises a shell parameter.

5. The energy absorbing structure of claim 4, wherein the shell parameter comprises at least one of a shell thickness, the shell thickness configured to vary as a function of position; cross-sectional geometry; sell dimensions, or a shell density, the shell density configured to vary as a function of position.

6. The energy absorbing structure of claim 3, wherein the spatially dependent profile comprises a shell material.

7. The energy absorbing structure of claim 3, wherein the additively manufactured crash component is configured to absorb the amount of crash energy based upon at least one of an intended air-bag deployment profile or a deceleration profile.

8. The energy absorbing structure of claim 1, wherein the internal cavity comprises foam.

9. The energy absorbing structure of claim 1, wherein the additively manufactured crash component is a frame crush rail.

10. A energy absorbing structure comprising an additively manufactured crash component, the additively manufactured crash component comprising:
an internal hollow region;
a shell having a variable cross section profile.

11. The energy absorbing structure of claim 10, wherein the additively manufactured crash component further comprises at least one additively manufactured reinforcement element.

12. The energy absorbing structure of claim 10, wherein the variable cross section profile is configured to enhance deformation mode and energy absorption capacity.

13. The energy absorbing structure of claim 10, wherein the variable cross section profile comprises a gauged thickness, the gauged thickness a function of a length of the crash component.

14. The energy absorbing structure of claim 13, wherein the variable cross section profile comprises at least one crush initiation feature configured to initiate a structural collapse of the additively manufactured crash component during an impact event.

15. The energy absorbing structure of claim 14, wherein the at least one crush initiation feature is configured to initiate a structural collapse of the additively manufactured crash component during an impact event via at least one of a geometrical variation or a material variation.

16. The energy absorbing structure of claim 14, wherein the at least one crush initiation feature is an additively manufactured feature based upon a print parameter of a three dimensional (3D) printer.

17. The energy absorbing structure of claim 14, wherein the additively manufactured crash component is configured to perform at least one of substantially absorb an amount of impact energy during the impact event or substantially absorb and re-distribute an amount of impact energy away from an occupant during an impact event.

18. A energy absorbing structure comprising an additively manufactured crash structure, the additively manufactured crash structure comprising:
a target impact location; and
an additively manufactured open cell structure located at the target impact location.

19. The energy absorbing structure of claim 18,
wherein the additively manufactured crash structure is positioned at the front of a transport vehicle incorporating the energy absorbing structure; and
wherein the target impact location is the front of the additively manufactured crash structure.

20. The energy absorbing structure of claim 18,
wherein the additively manufactured crash structure is positioned at the rear of a transport vehicle incorporating the energy absorbing structure; and
wherein the target impact location is the rear of the additively manufactured crash structure.

21. The energy absorbing structure of claim 18, wherein the additively manufactured open cell structure comprises a lattice.

22. The energy absorbing structure of claim 21,
wherein the lattice comprises a variable lattice density as a function of distance from the target impact location; and
wherein the variable lattice density is least at the target impact location.

23. The energy absorbing structure of claim 21, wherein the additively manufactured lattice comprises a bumper.

24. A energy absorbing structure comprising:
a first structure region;
a second structure region; and
an additively manufactured crash component positioned between the first structure region and the second structure region, the additively manufactured crash component including:
a base structure, and
a subordinate structure, added to the base structure and configured to form, in combination with the base structure, an energy absorbing structure.

25. The energy absorbing structure of claim 24, wherein the subordinate structure comprises an additively deposited material having a lower strength, higher ductility material relative to the base structure, the additively deposited material additively deposited at locations on the base structure selected so that the energy absorbing structure is configured to act as a crumple initiator.

26. The energy absorbing structure of claim 24, wherein the subordinate structure comprises a structural lattice configured to form a crash rail.

27. The energy absorbing structure of claim 26, wherein the structural lattice is configured to absorb energy using high ductility, low yield materials placed strategically in the lattice.

28. The energy absorbing structure of claim 24, wherein the structural lattice is configured to directed crash energy to areas where a conversion takes place using multiple mixed materials in specific geometric patterns.

29. The energy absorbing structure of claim 24, wherein the base structure is additively manufactured.

30. The energy absorbing structure of claim 24, wherein the base structure is an extrusion.

31. The energy absorbing structure of claim 30, wherein the subordinate structure comprises an additively deposited structure, additively deposited on the extrusion and configured to selectively strengthen one area over another area to control a crumple of the energy absorbing structure.

32. The energy absorbing structure of claim 31, wherein the additively deposited structure comprises a cold spray material.

33. The energy absorbing structure of claim 24, wherein the base structure is a hollow square composite tube.

34. The energy absorbing structure of claim 33, wherein the subordinate structure comprises a coldspray material.

35. The energy absorbing structure of claim 34, wherein the coldspray material comprises a strong ductile aluminum alloy on the outside of the hollow square composite tube to create a hybrid carbon fiber reinforced polymer (CFRP)-aluminum crash rail.

* * * * *